United States Patent [19]
Kashiwazaki

[11] Patent Number: 5,365,449
[45] Date of Patent: Nov. 15, 1994

[54] NAVIGATION DEVICE

[75] Inventor: Takashi Kashiwazaki, Kawagoe, Japan

[73] Assignee: Pioneer Electronic Corporation, Tokyo, Japan

[21] Appl. No.: 949,798

[22] Filed: Sep. 22, 1992

[30] Foreign Application Priority Data

Sep. 27, 1991 [JP] Japan .................................. 3-249187

[51] Int. Cl.5 .......................................... G06F 15/50
[52] U.S. Cl. ................................. 364/449; 364/444; 340/990; 340/995
[58] Field of Search .................... 364/443, 444, 449; 73/178 R; 340/988, 990, 995

[56] References Cited

U.S. PATENT DOCUMENTS

| 4,774,671 | 9/1988 | Itoh et al. | 364/444 |
|---|---|---|---|
| 4,774,672 | 9/1988 | Tsunoda et al. | 364/444 |
| 4,882,689 | 11/1989 | Aoki | 340/995 |
| 4,937,752 | 6/1990 | Nanba et al. | 340/990 |
| 4,965,574 | 10/1990 | Fukushima et al. | 340/995 |
| 5,220,507 | 6/1993 | Kirson | 340/995 |
| 5,243,528 | 9/1993 | Lefebvre | 340/990 |
| 5,243,529 | 9/1993 | Kashiwazaki | 340/990 |

OTHER PUBLICATIONS

Patent Abstracts of Japan vol. 14, No. 325 (P1075) 12 Jul. 1990 & JP-A-21 07 917 (Sony Corp) 19 Apr. 1990.
Patent Abstracts of Japan vol. 14, No. 569 (P-1144) 18 Dec. 1990 & JP-A-22 45 613 (Mitsubishi Motors Corp) 1 Oct. 1990.
European Search Report Application No. 92 30 8706 and Annex; dated Feb. 25, 1993 and Communication dated Mar. 3, 1993.

Primary Examiner—Gary Chin
Attorney, Agent, or Firm—Kane, Dalsimer, Sullivan, Kurucz, Levy, Eisele and Richard

[57] ABSTRACT

A navigation device is provided with: a device for measuring a present position of a movable body equipped with the navigation device; a device for displaying map information; a device for storing destination information including at least positional information of a destination to which the movable body is scheduled to move, and an estimated time to arrive at the destination; and a control device for controlling the displaying device to display the map information, which corresponds to the measured present position, and display the measured present position on the displayed map information, selecting destination information, which corresponds to a destination located in the displayed map information, from the stored destination information, and controlling the displaying device to display the selected destination information on the displayed map information.

21 Claims, 10 Drawing Sheets

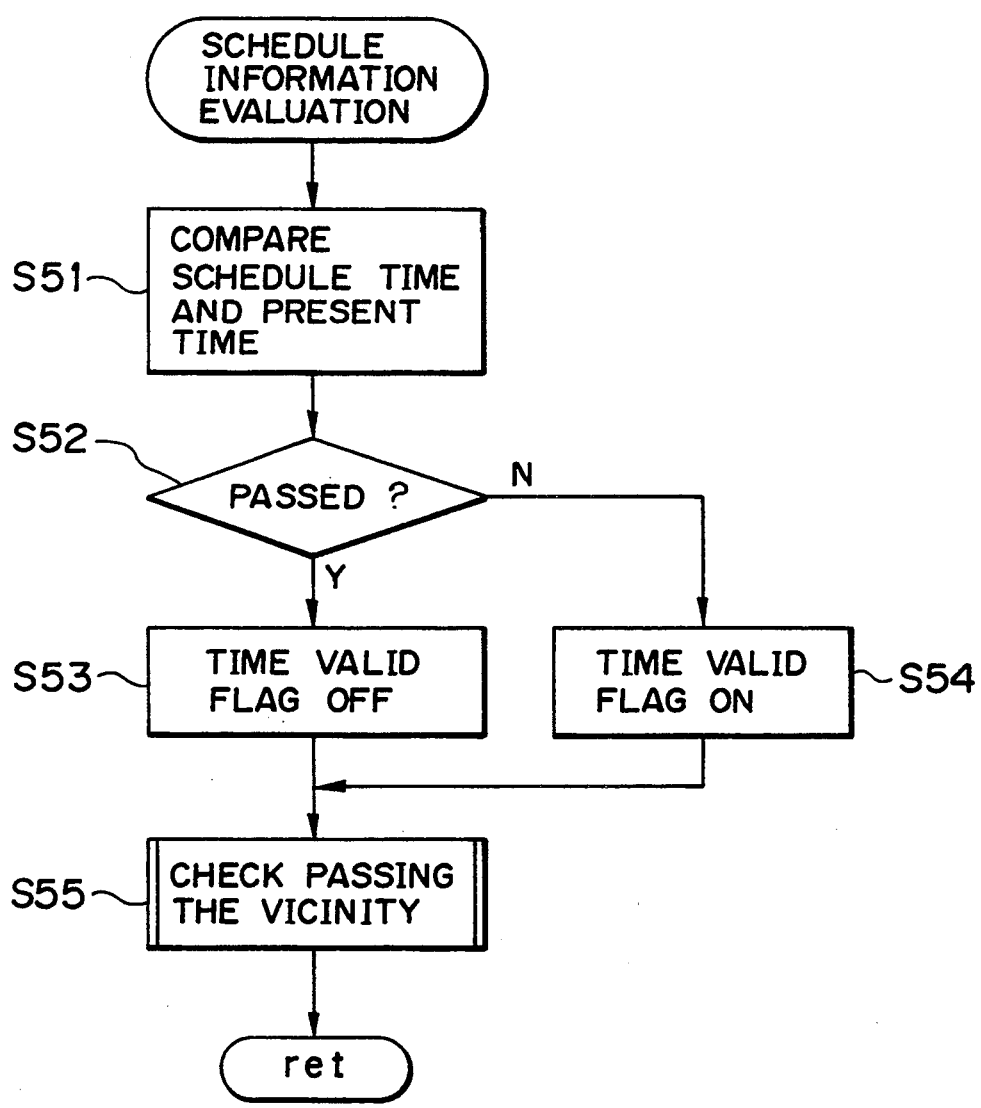

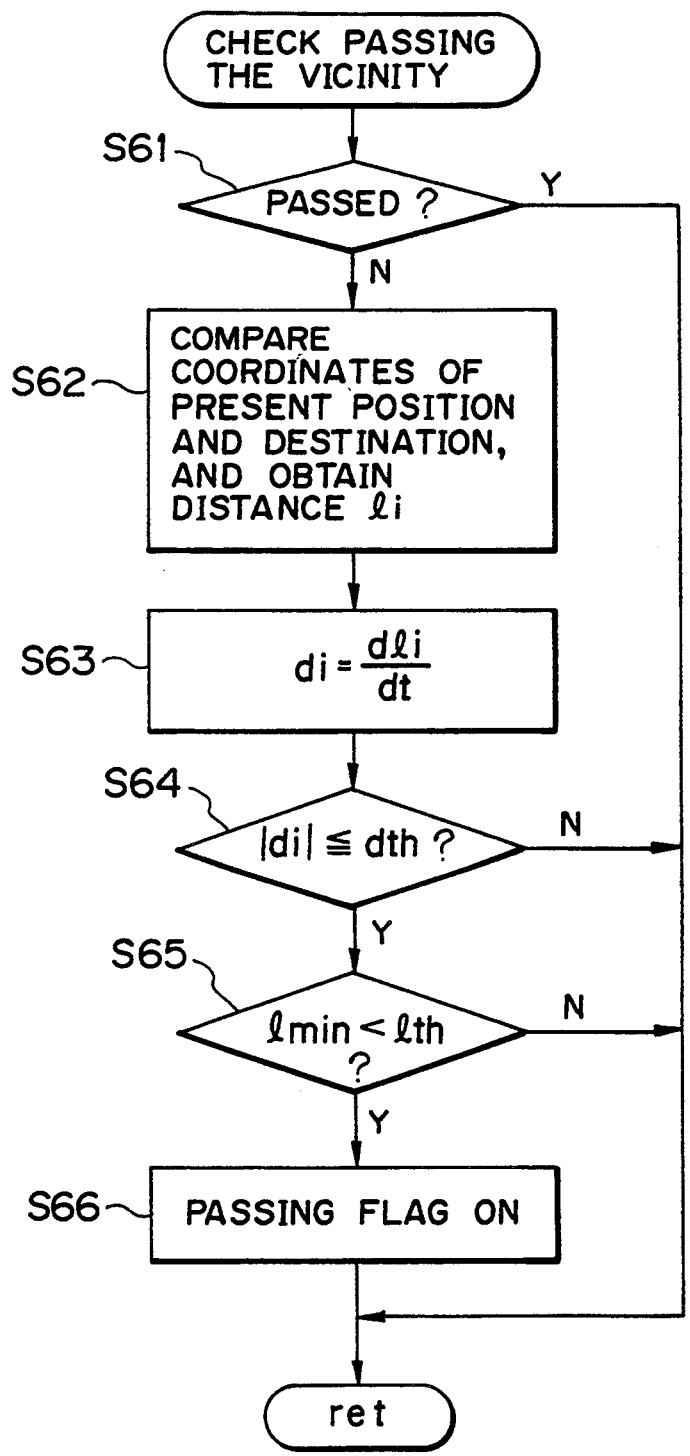

⊙ PRESENT POSITION

★ DESTINATION POSITION

NAVIGATION DEVICE

BACKGROUND OF THE INVENTION

1. Field of the Invention

The present invention relates to a navigation device, which supports a driving operation of a movable body such as automobiles, airplanes and ships, by displaying a map information and a present position information of the movable body in the map information.

2. Description of the Related Art

There is a navigation device which supports a driving operation of a movable body installed with the navigation system, by measuring the present position of the movable body by means of a GPS (Global Positioning System), and displaying thus measured position as the present position, which moves every moment, in a displayed map where the present position is included.

On the other hand, in case that the movement is performed quite often by a movable body such as automobiles, a schedule as for the movement may be made in advance by use of the information as for the planned destinations and the estimated times to arrive the destinations, so that the movement is performed according to the schedule. Particularly, in a certain kind of business such as a delivery business, in which the movement should be done to a plurality of places to visit in one day, the order of the places to visit and the estimated arriving times to the places to visit, are considered to make the schedule by listing up the places to visit, so as to make the whole movement effective in one day.

However, in this kind of movement based on the schedule, the confirmation of the next destination and the moving path to the next destination, becomes a necessary for the driver in the middle way. That is to say, the address of the next destination must be checked with referring to the schedule table, and the moving path must be further checked by opening the map book and searching the present position and the destination in the map book, while driving the movable body. Especially, in case that the driver is not familiar with the neighborhood of the destination, such a checking operation for the present position and the moving path must be done quite often, resulting in a great inconvenience for the driver. On the other hand, in case of the movement for sight-seeing, the driver is not generally familiar with the geography of the places to visit, so that the inconvenience for the driver to quite often check the map book becomes more serious.

SUMMARY OF THE INVENTION

It is therefore an object of the present invention to provide a navigation device, which allows the user to easily obtain and understand the information to efficiently support the driving operation.

The above object of the present invention can be achieved by a navigation device provided with: a device for measuring a present position of a movable body equipped with the navigation device; and a device for displaying map information. The navigation device is further provided with: a device for storing destination information including at least positional information of a destination to which the movable body is scheduled to move, and an estimated time to arrive at the destination; and a control device for controlling the displaying device to display the map information, which corresponds to the measured present position, and display the measured present position on the displayed map information, selecting destination information, which corresponds to a destination located in the displayed map information, from the stored destination information, and controlling the displaying device to display the selected destination information on the displayed map information.

In thus constructed navigation device, when the present position is measured by a measuring device such as a GPS receiver, an azimuth sensor, a driving sensor etc., the map information, which corresponds to the measured present position, is displayed on the displaying device. Then, the control device selects, form the destination information stored in the storing device, the destination information, which corresponds to the displayed map information, one after another as the present position changes. At this time, the control device controls the displaying device to display thus selected destination information, such as a mark indicating the position of the destination, letter information indicating the estimated time to arrive the destination, the name of the destination, etc., on the displayed map together with the measured present position.

Accordingly, since the measured present position, which moves on the map every moment as the movable body moves, and the information as for the destination, can be displayed on the map information, the driver i.e. the user can simultaneously check and confirm the present position of the movable body, the information as for the destination and the moving path to the destination, at a moment notice, bringing a great convenience to the user.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 5 is a flow chart of a schedule information evaluating process of the navigation device of FIG.1;

FIG. 6 is a flow chart of a process of checking a passage in the vicinity of a destination of the navigation device of FIG.1;

DETAILED DESCRIPTION OF THE PREFERRED EMBODIMENTS

Referring to the accompanying drawings, preferred embodiments of the present invention will be now explained.

Figure 1:
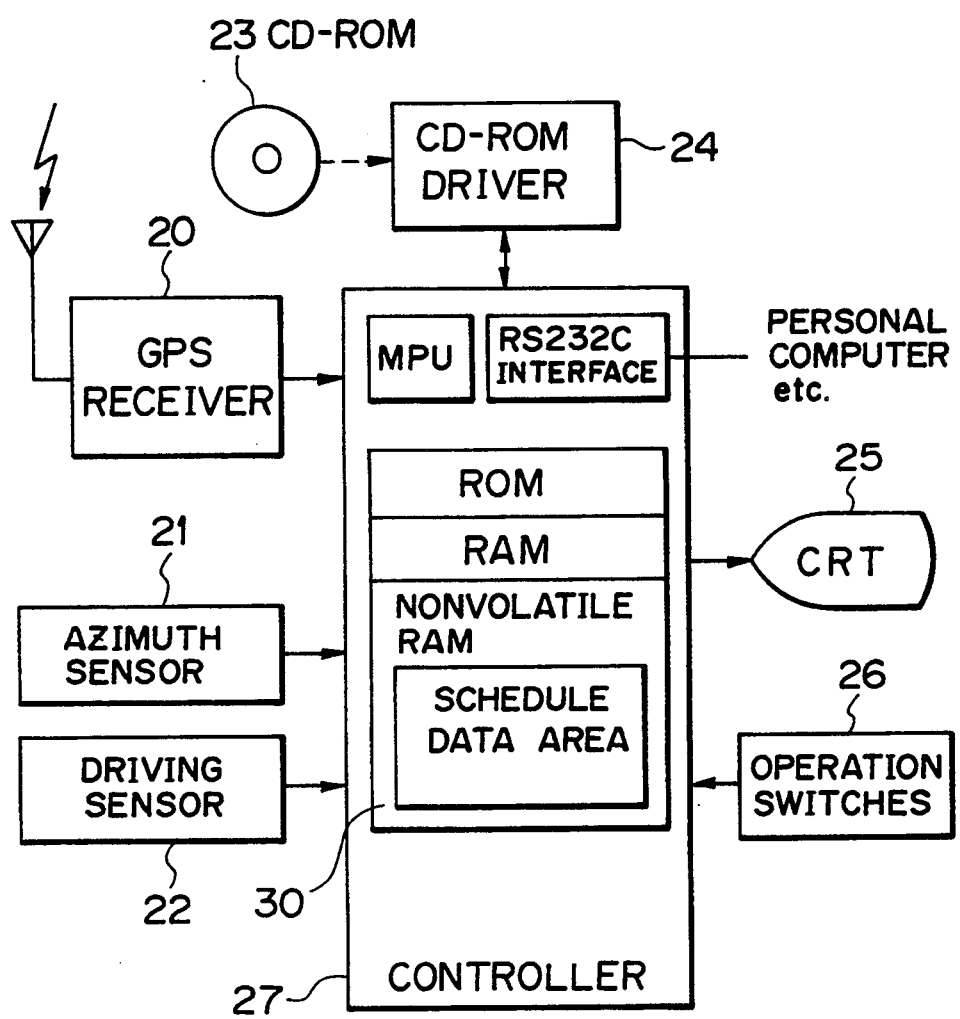
FIG. 1 is a block diagram of a navigation device as one embodiment of the present invention.

FIG.1 shows a construction of a navigation system for a movable body as one embodiment of the present invention.

In FIG. 1, the navigation system is provided with a GPS (Global Positioning System) receiver 20 for measuring a present position of the movable body by receiving an electric wave or radio wave exclusive for the measurement, an azimuth sensor 21 for detecting a driving azimuth of the movable body by use of a geomagnetic sensor, Gyro sensor etc., a driving sensor 22 for detecting driving conditions such as a driving speed, a driving distance etc., a CD (Compact Disc)-ROM (Read Only Memory) 23 as a data base of map information, a CD-ROM driver 24 for reading out the information from the CD-ROM 23, a CRT (Cathode Ray Tube) 25 for displaying the map and other information, operation switches 26 via which various operation commands are inputted, and a controller 27 for controlling the whole navigation system. Instead of the CRT 25, known display devices such as a LCD (Liquid Crystal Display) device, EL (Electroluminesense) display device, etc., can be utilized in the present embodiment. Instead of the CD-ROM 23, known memory devices such as a magneto-optical disc, a hard disc, a tape recorder, an IC (Integrated Circuit) card, etc., can be utilized in the present embodiment.

The GPS receiver 20 is adapted to generate present position data indicating the longitude and latitude of the movable body by means of the GPS receiving the electric wave signal from a satellite.

The azimuth sensor 21 and the driving sensor 22 are self-sustained type measuring devices, to independently output detection signals, with which the present position data indicating the longitude and latitude of the movable body more precisely, are calculated by a calculating means realized in the controller 27. These measuring devices are selectively used depending on the actual conditions, or both are used simultaneously used so as to improve the accuracy of the present position to be measured.

The controller 27 is provided with an MPU (Microprocessor Unit) for performing data processes and other various controls, a ROM (Read Only Memory) and RAM (Random Access Memory) for storing the program and other data of the MPU, a battery-backup nonvolatile RAM 30, an RS232C interface for data communication with eternal devices, and various interfaces not shown in the figure. In the nonvolatile RAM 30, an area for storing schedule data is preserved as a schedule memory device.

In the above-mentioned construction, the controller 27 obtains the present position data estimated by the data of the GPS receiver 20 and the driving sensor 22 which are switched-on as the present position indicating devices. Then, the controller 27 reads the map information corresponding to the obtained present position data from the CD-ROM 23 via the CD-ROM driver 24, and displays the read-out map information and a mark indicating the present position on the CRT 25. Further, the controller 27 obtains the present position data periodically to renew the display of the map information and the mark indicating present position, according to the movement of the movable body.

The controller 27 is also adapted to perform a menu display on the CRT 25, according to the command input from the operation switches 26. BY the selection input with respect to the menu display, various information other than the map information is read-out from the CD-ROM 23 or other ROM of the controller 27, so as to display the read-out information onto the CRT 25.

In this embodiment especially, an item of a "schedule display" is established in the menu. If, the schedule display out of the menu, is instructed to be performed by the command input, the display flag for the schedule display is turned to be ON, so that the schedule information is processed to be displayed in the displayed map together with the mark indicating the present position, when the present position map is displayed. The schedule displaying process will be described in detail hereinbelow.

Figure 2:
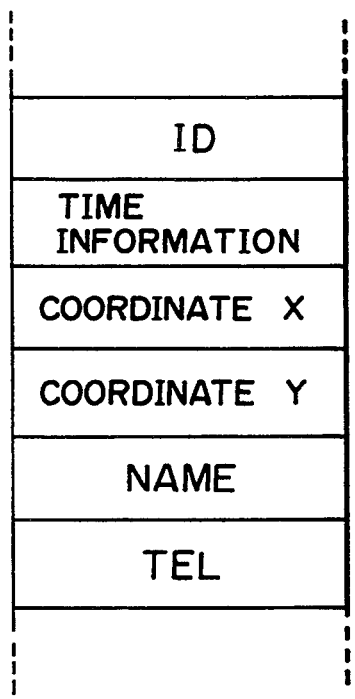
FIG. 2 is a diagram showing a data structure of a schedule data in the navigation device of FIG.1.

FIG.2 shows one example of a data structure of the information as for one destination, in the schedule data stored in the nonvolatile RAM 30.

As shown in FIG.2, the information as for the destination, includes an ID for indicating the recording number, a time information for indicating an estimated time to arrive the destination, coordinates (X,Y) information of the destination in the map, a name of the destination, and a telephone number (TEL) of the destination. These schedule data are inputted via the RS232C interface. Namely, when the personal computer etc., connected to the RS232C interface gives the command data to the controller 27 to input the schedule data, the controller 27 stores successively the schedule data inputted in succession after the command data, into the schedule data area of the nonvolatile RAM 30 in FIG.1.

Figure 3:
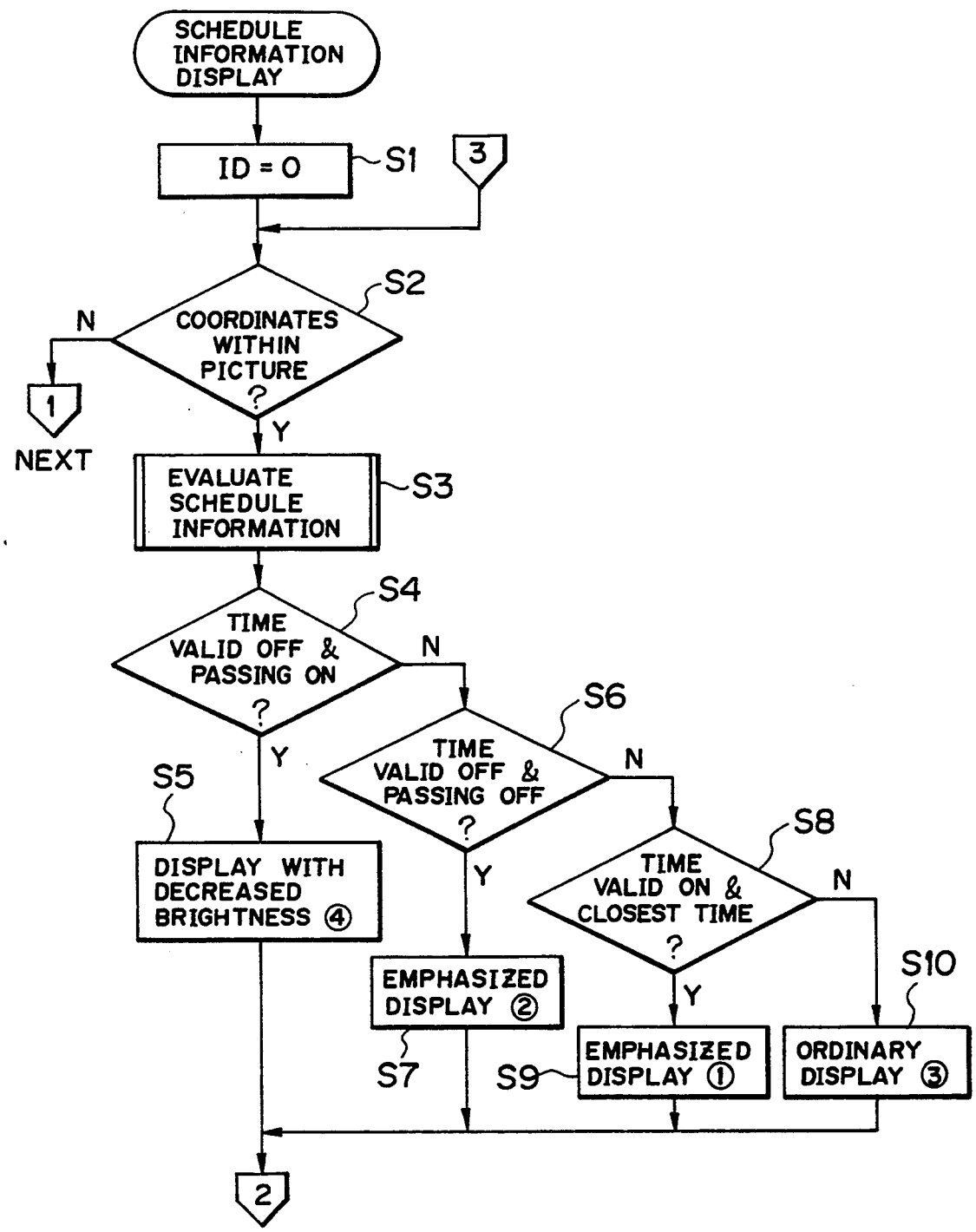
FIG. 3 is a first portion of a flow chart of a schedule information displaying process of the navigation device of FIG.1.
Figure 4:
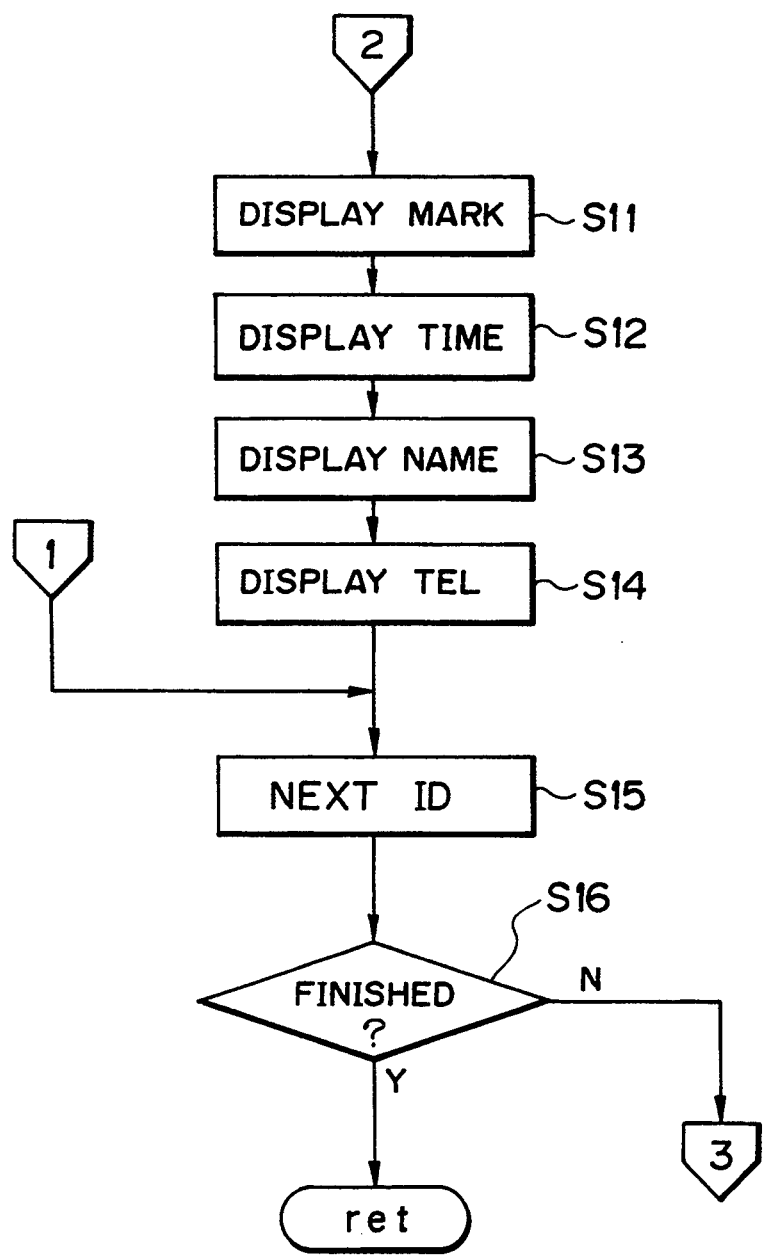
FIG. 4 is a second portion of a flow chart of a schedule information displaying process of the navigation device of FIG.1.

FIGS.3 to 6 show the flow charts of the schedule information displaying process, which is performed by the controller 27 as the schedule displaying device. More specifically, FIGS.3 and 4 show the main routine of the process, while FIGS.5 and 6 show the sub-routines of the process.

The schedule information displaying process is started after the present position map is processed to be displayed by the controller 27. The controller 27 judges whether or not there exists any schedule data storing process or the displaying process, before starting the main routine shown in FIG.3. Namely, the controller 27 judges whether or not the schedule data is stored in the schedule data area of the nonvolatile RAM 30 or not. If the schedule data is stored, the controller 27 checks the schedule display flag. In this flag checking process, as aforementioned, if the "schedule display" is not instructed by the command input at the menu display, the schedule display flag is OFF, so that the schedule display is not performed. Alternatively, if the schedule display flag is ON by the command input at the menu display, the displaying process for schedule information is performed.

In the displaying process for schedule information, as shown in FIG. 3, the setting process to access the initial information (ID=0) in the schedule data, is firstly performed (step S1). Then, the coordinates data in the accessed destination information, is checked. That is to say, it is checked whether or not the position indicated by the coordinates i.e. the destination is within the picture of the currently displayed map (step S2). If the accessed destination is out of the currently displayed map (NO), the flow branches to the step S15 in FIG.4 (NEXT ID), and the access for the next destination information is performed. If the accessed destination is within the currently displayed map at the step S2 (YES), the flow goes to the step S3, and the evaluation as for the time and the passage of the destination is performed on the basis of the schedule information (step S3).

Here, the evaluating process for the schedule information will be explained with referring to FIGS. 5 and 6. The schedule information evaluating process is performed, as shown in FIG.5, by firstly comparing the estimated arriving time in the schedule information and the present time (steps S51 and S52). If the present time is later than the estimated arriving time at the step S52 (YES), the flow goes to the step S53, and the time valid flag is turned to be "OFF" (step S53). Alternatively, if the present time is not later than the estimated arriving time at the step S52 (NO), the flow branches to the step S54, and the time valid flag is turned to be "ON" (step S54). Then, it is Judged whether or not the movable body has passed the vicinity of the destination (step S55).

Figure 7A:
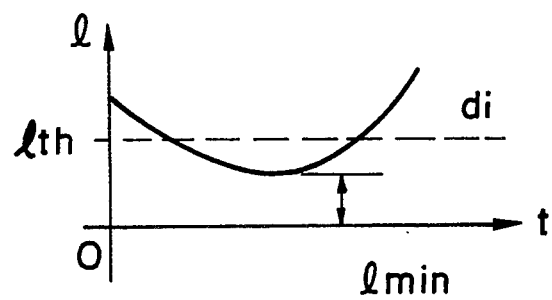
FIG. 7A and 7B are diagrams explaining the checking process of FIG.6.
Figure 7B:
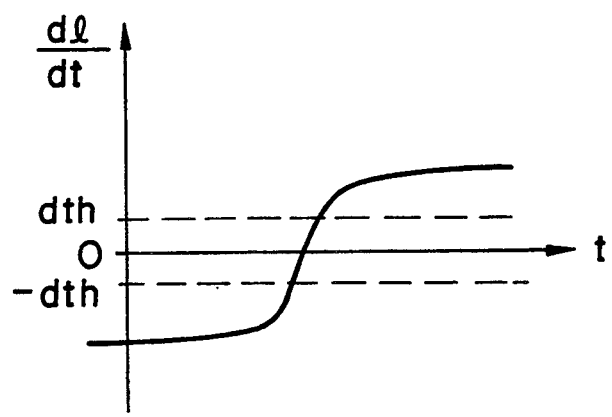

The judging process at the vicinity of the destination will be explained here with referring to FIG.6. At first, it is judged whether or not the judging process has been already performed and the result is positive i.e. the movable body is judged to have passed the destination (step S61). If the movable body has not passed yet (NO), the distance li from the present position to the destination is calculated by use of the coordinates data of the present position and the destination (step S62). Next, the changing rate di of the distance li is calculated as: di=d li/d t (step S63). The changing rate di may become a curve as shown in FIG.7A, when the movable body passes through the destination. Then, the changing rate di is compared with predetermined threshold values dth and −dth, and it is judged whether or not the changing rate di is within the range prescribed by the threshold values of dth and −dth as: |di|≦dth, as shown in FIG.7B (step S64). If the changing rate di is within this range prescribed by the threshold values (YES), the minimum value lmin of the changing rate is compared with the predetermined threshold value lth (step S65). If the minimum value lmin is smaller than the threshold value lth, it is judged that the movable body has passed the vicinity of the destination, so that the destination passing flag is turned to be ON (step S66).

Nextly, returning to the flow chart of FIG.3, the processes after the above-mentioned schedule information evaluating process (step S3), will be explained.

In FIG.3, when the schedule information evaluation is completed as for the time and the passage of the destination, the time valid flag and the destination passing flag are checked, so that the brightness to display the destination information is determined in the following manner.

Namely, it is judged whether or not the time valid flag is OFF and the destination passing flag is ON (step S4). That is to say, if it has passed the estimated arriving time and the movable body has already passed the destination, the brightness to display the destination information is to be set decreased (step S5).

If the time valid flag is OFF and the destination passing flag is not ON at the step S4 (NO), it is further judged whether or not the time valid flag is OFF and the destination passing flag is OFF (step S6). Namely, if it has passed the estimated arriving time but the movable body has not passed the destination yet, the brightness to display the destination information is set to be increased to emphasis the displayed information (step S7).

If the time valid flag is OFF and the destination passing flag is not OFF at the step S6 (NO), it is further judged whether or not the time valid flag is ON and the destination has the estimated arriving time closest to the present time (step S8). Namely, the destination which the movable body has not passed yet and which has the estimated arriving time closest to the present time, is set to be displayed with more emphasized brightness i.e. the most bright image is given to this judged destination among all the destinations if it has the closest estimated arriving time (step S9).

If the time valid flag is ON and the estimated arriving time is not closest to the present time at the step S8 (No), the destination information is set to be displayed with the ordinary brightness (step S10). In the flow chart of FIG.3, the circled numerals indicate the levels of the brightness on the display. Namely, in the present embodiment, the brightness of the destination information on the display, are divided into four levels.

Nextly, the displaying process of the destination information as shown in the flow chart of FIG.4, will be explained. In the following processes, the destination information is displayed with one of the brightness levels set by the above-mentioned processes.

In FIG.4, the process of displaying a mark of destination on the displayed map at the position indicated by the coordinates data, is firstly performed (step S11). Then, the time, name and telephone number of the destination are processed to be displayed successively (steps S12, S13 and S14).

Figure 8:
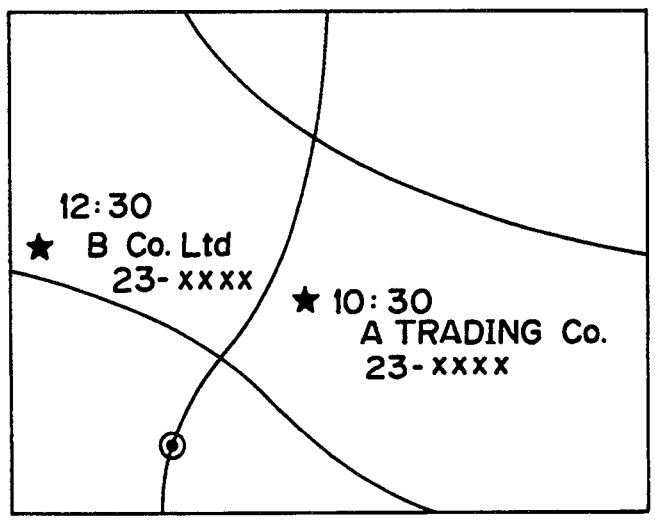
FIG.8 is one example of a display of the navigation device of FIG.1.

FIG.8 shows one example of display in which the destination information is displayed in the map.

In FIG.4, when the displaying process of the present destination information, is completed, the accessing process is performed with respect to the next destination information (NEXT ID) at the step S15. At this time, it is checked whether or not all of the destination information are finished to be judged (step S16). If all of the destinations are not judged yet (NO), the flow goes back to the step S2 of FIG.3, and the judgement is performed with respect to the next destination information and this process is repeated until the judgements with respect to all of the destination information are finished.

The above-mentioned displaying process of the schedule information is executed at each unit time period. In the aforementioned example shown in FIG.8, the mark indicating the destination position is shown as a star mark. The numbers indicating the order of the movement of the movable body, may be displayed.

In this manner, the schedule data as for the destination of driving, is stored and judged every time when the map is displayed, and the position of the destination and various information related to the destination are automatically displayed in the displayed map, according to the present embodiment. Thus, as long as the users make the schedule in advance, and input the schedule data into the navigation system via the personal computer, the destination information such as the position of the destination, the estimated arriving time and so on, can be sequentially displayed in accordance with the movement of the movable body, bringing a great convenience for the users.

Further, according to the present embodiment, the estimated arriving time information in the schedule information, is evaluated as the movable body keeps driving, and the estimated arriving time is judged and revised with respect to the present time, wherein the display is enabled such that the brightness of each destination information is changed depending on whether or not it has passed the estimated arriving time for each destination. The distance from the present position to the destination is obtained by use of the position information in the schedule information and the present position information obtained by the GPS system, so that the judgement whether or not the movable body has passed the destination is enabled by use of the condition of the changing rate of this obtained distance, wherein the display is enabled such that the brightness of each destination information is also changed depending on the result of this judgement.

The display of the destination information with respect to the destination which the movable body has already passed, is executed in a non-outstanding manner by use of an ordinary brightness. On the other hand, the display of the destination information with respect to the destination which the movable body has not passed yet and when it has passed the arriving time for the pertinent destination, or with respect to the destination which the movable body will pass nextly, is executed in an outstanding manner with a strong brightness.

According to the present embodiment, the destination position is displayed together with the present position in the map, so that the destination position with respect to the present position can be immediately checked and confirmed at a moment notice, and the next destination and the passage to the next destination can be simultaneously referred to, in accordance with the movement of the movable body. Further, since the users can understand the present condition with respect to the schedule, immediately by virtue of the brightness of the display, an great advantage can be brought to the driving support.

In the above-mentioned embodiment, though the schedule data is inputted from the external via the RS232C interface, a standard one day schedule for sight-seeing in a set of famous places in one district, for example, may be made and stored in advance, into the CD-ROM or ROM of the navigation system, so that the places and the estimated arriving time can be sequentially displayed, in accordance with the movement of the movable body in the sight seeing places, without inputting the schedule data for each day trip.

In another embodiment of the present invention, an IC (Integrated Circuit) card is utilized as a device for inputting the schedule data to the navigation system from the external, in stead of the data transmission via the RS232C interface of the aforementioned embodiment.

Figure 9:
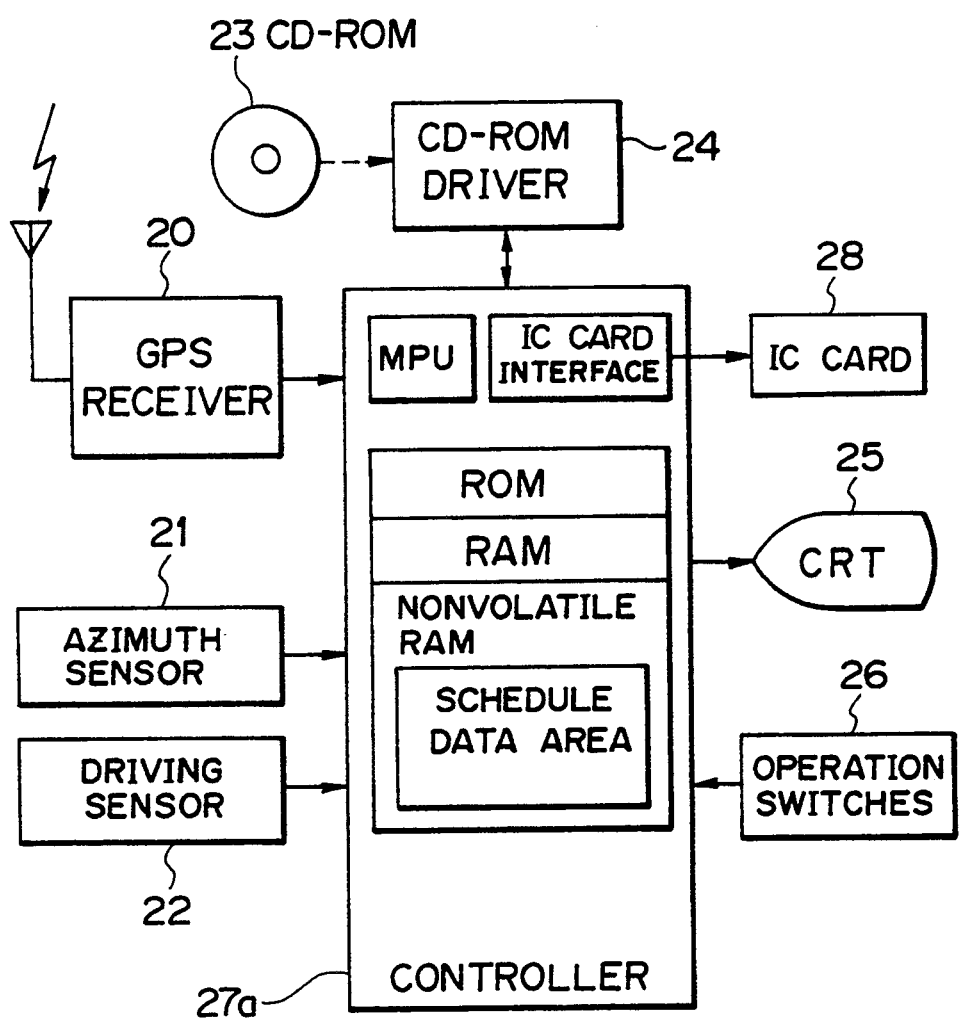
FIG.9 is a block diagram of another embodiment of the present invention.

In this case, it is preferable, as shown in FIG.9, to input the schedule data into the IC card 28 by use of a personal computer, in advance, and to input the schedule data into the controller 27a of the navigation system by use of the IC card 28 via an IC card interface provided in the controller 27a. Accordingly, the schedule data can be inputted to the navigation system Just by carrying the IC card 28 into the movable body, bringing a great convenience. In FIG.9, the elements same as those in the first embodiment of FIG. 1, carry the same reference numerals and the explanations thereof are omitted.

In another embodiment of the present invention, an electric wave receiver is utilized as a device for inputting the schedule data to the navigation system from the external, in stead of the RS232C interface of the aforementioned embodiment.

Figure 10:
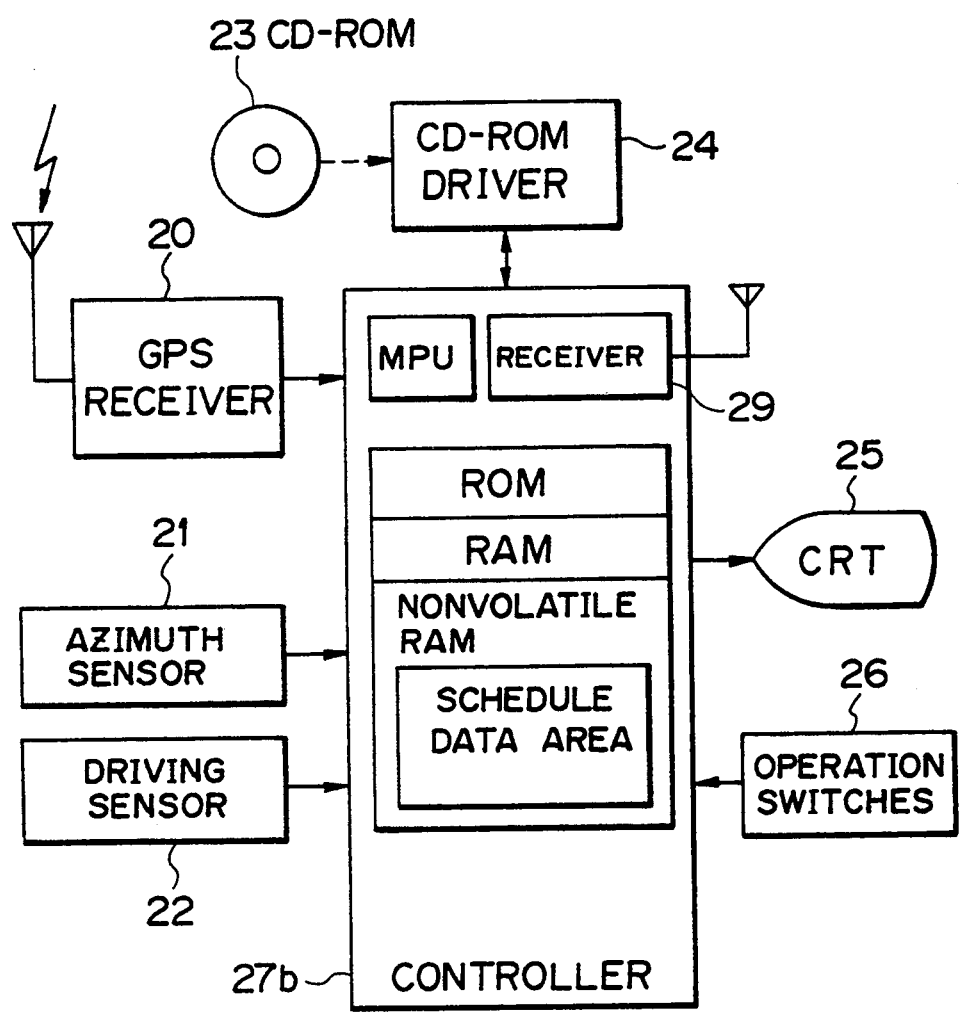
FIG.10 is a block diagram of another embodiment of the present invention.

In this case, it is preferable, as shown in FIG.10, to transmit the schedule data by use of the electric wave as a carrier from a remote station, and to receive it by a receiver 29 provided in a controller 27b of the navigation system in real time, such that the instructions as for the destination by the remote station, is automatically displayed on the map in real time. In this manner, such a system is enabled that the user can move the movable body just according to the destination instructed by the remote station or the remote control center. In FIG.10, the elements same as those in the first embodiment of FIG. 1, carry the same reference numerals, and the explanation thereof are omitted.

In the above embodiments, though the brightness is changed on the display according to the judgement of the schedule information, the color may be changed on the display instead of the brightness.

As discussed above in detail, the destination position and the estimated arriving time are displayed on the map together with the present position, and are updated as the map is renewed in accordance with the movement of the movable body. Therefore, since the destination can be identified with respect to the present position at a moment notice, and since the next destination and the road to the next destination can be simultaneously referred to on the display, the navigation system of the present invention support quite effectively the drive operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A navigation device comprising:
   means for measuring a present position of a movable body equipped with said navigation device;
   means for displaying map information;
   means for storing destination information including at least positional information of a destination to which said movable body is scheduled to move, and an estimated time to arrive at the destination; and
   a control means for controlling said displaying means to display the map information, which corresponds to the measured present position, and display the measured present position on the displayed map information, selecting destination information, which corresponds to a destination located in said displayed map information, from the stored destination information, and controlling said displaying means to display the selected destination information on the displayed map information,
   wherein said control means calculates a distance from the measured present position to the destination and a changing rate of the calculated distance, judges whether or not said movable body has passed the destination if the changing rate is within a predetermined threshold range and a minimum value of the calculated distance is smaller than a predetermined threshold value to output a judgement result, and controls said displaying means to change the brightness of the displayed destination information depending on the judgment result.

2. A navigation device according to claim 1, wherein said measuring means comprises at least one of a GPS (Global Positioning System) receiver, an azimuth sensor, and a driving sensor.

3. A navigation device according to claim 1, wherein said destination information storing means comprises a RAM (Random Access Memory).

4. A navigation device according to claim 3, wherein said RAM comprises a battery-backup type nonvolatile RAM.

5. A navigation device according to claim 1, further comprising means for storing map information.

6. A navigation device according to claim 5, wherein said map information storing means comprises a CD-ROM (Compact Disc-Read Only Memory).

7. A navigation device according to claim 1, further comprising means for inputting the destination information to said destination information storing means from the external of the navigation device.

8. A navigation device according to claim 7, wherein said inputting means comprises one selected from a group of RS232C interface, an IC (Integrated Circuit) card interface, and an electric wave receiver.

9. A navigation device according to claim 1, wherein said control means comprises an MPU (Microprocessor Unit).

10. A navigation device according to claim 1, further comprising operation switches for inputting various operation commands to said control means.

11. A navigation device according to claim 1, wherein said destination information further includes at least one of coordinates of the destination, a name of the destination, and a telephone number of the destination.

12. A navigation device according to claim 1, wherein a flag is turned to be ON in said control means, when it is judged that said movable body has passed the destination, and said control means controls said displaying means depending on a status of the flag.

13. A navigation device comprising:
means for measuring a present position of a movable body equipped with said navigation device;
means for displaying map information;
means for storing destination information including at least positional information of a destination to which said movable body is scheduled to move, and an estimated time to arrive at the destination; and
a control means for controlling said displaying means to display the map information, which corresponds to the measured present position, and display the measured present position on the displayed map information, selecting destination information, which corresponds to a destination located in said displayed map information and includes at least one of coordinates of the destination, a name of the destination, and a telephone number of the destination, from the stored destination information, and controlling said displaying means to display the selected destination information on the displayed map information,
wherein said control means compares the estimated time and a present time, judges whether or not it has passed the estimated time to output a result of judgment, and controls said displaying means to change the brightness of the displayed destination information depending on the result of judgment.

14. A navigation device according to claim 13, wherein said measuring means comprises at least one of a GPS (Global Positioning System) receiver, an azimuth sensor, and a driving sensor.

15. A navigation device according to claim 13, wherein said destination information storing means comprises a battery-backup type nonvolatile RAM (Random Access Memory).

16. A navigation device according to claim 13, further comprising a CD-ROM (Compact Disc-Read only Memory).

17. A navigation device according to claim 13, further comprising means for inputting the destination information to said destination information storing means from the external of the navigation device,
wherein said inputting means comprises one selected from a group of RS232C interface, an IC (Integrated Circuit) card interface, and an electric wave receiver.

18. A navigation device according to claim 13, further comprising operation switches for inputting various operation commands to said control means.

19. A navigation device according to claim 13, wherein a flag is turned to be ON in said control means, when it is judged that it has passed the estimated time, and said control means controls said displaying means depending on a status of the flag.

20. A navigation device comprising:
means for measuring a present position of a movable body equipped with said navigation device;
means for displaying map information;
means for storing destination information including at least positional information of a destination to which said movable body is scheduled to move, and an estimated time to arrive at the destination; and
a control means for controlling said displaying means to display the map information, which corresponds to the measured present position, and display the measured present position on the displayed map information, selecting destination information, which corresponds to a destination located in said displayed map information, from the stored destination information, and controlling said displaying means to display the selected destination information on the displayed map information,
wherein said control means calculates a distance from the measured present position to the destination and a changing rate of the calculated distance, judges whether or not said movable body has passed the destination if the changing rate is within a predetermined threshold range and a minimum value of the calculated distance is smaller than a predetermined threshold value to output a first result of judgment, compares the estimated time and a present time, judges whether or not it has passed the estimated time to output a second result of judgment, and controls said displaying means to change the brightness of the displayed destination information depending on the first and second results of judgment.

21. A navigation device comprising:
means for measuring a present position of a movable body equipped with said navigation device;
means for displaying map information;
means for storing destination information including at least positional information of a destination to which said movable body is scheduled to move, and an estimated time to arrive at the destination; and
a control means for controlling said displaying means to display the map information, which corresponds to the measured present position, and display the measured present position on the displayed map information, selecting destination information, which corresponds to a destination located in said displayed map information and includes at least one of coordinates of the destination, a name of the destination, and a telephone number of the destination, from the stored destination information, and controlling said displaying means to display the selected destination information on the displayed map information, wherein said control means calculates a distance from the measured present position to the destination and a changing rate of the calculated distance, judges whether or not said movable body has passed the destination on the basis of the calculated changing rate to output a first result of judgment, compares the estimated time and a present time, judges whether or not it has passed the estimated time to output a second result of judgment, and controls said displaying means to change the brightness of the displayed destination information depending on the first and second results of judgment.

* * * * *